(12) United States Patent
Hallale et al.

(10) Patent No.: US 8,356,465 B2
(45) Date of Patent: Jan. 22, 2013

(54) HEIGHT OF CUT ADJUSTER ASSEMBLY FOR REEL MOWER CUTTING UNIT WITH REMOVABLE ATTACHMENT

(75) Inventors: Sanjeev Hallale, Pune (IN); Richard D. Thier, Juneau, WI (US); Brent G. Rinholm, Fuquay-Varina, NC (US); Ronald L. Reichen, Raleigh, NC (US)

(73) Assignee: Deere & Company, Moline, IL (US)

( * ) Notice: Subject to any disclaimer, the term of this patent is extended or adjusted under 35 U.S.C. 154(b) by 178 days.

(21) Appl. No.: 12/703,485

(22) Filed: Feb. 10, 2010

(65) Prior Publication Data

US 2011/0192129 A1   Aug. 11, 2011

(51) Int. Cl.
*A01D 34/00*   (2006.01)

(52) U.S. Cl. ............................................. 56/17.2
(58) Field of Classification Search ............ 56/17.2, 56/249, 7, 254, 294
See application file for complete search history.

(56) References Cited

U.S. PATENT DOCUMENTS

| | | | | |
|---|---|---|---|---|
| 1,399,601 A * | 12/1921 | Boll | | 56/249 |
| 2,260,801 A * | 10/1941 | Clemson | | 56/249 |
| 2,637,157 A * | 5/1953 | Stegeman | | 56/249 |
| 2,660,018 A * | 11/1953 | Clemson | | 56/249 |
| 3,178,874 A * | 4/1965 | Hanson et al. | | 56/254 |
| 3,260,042 A * | 7/1966 | Hanson et al. | | 56/249 |
| 4,021,996 A * | 5/1977 | Bartlett et al. | | 56/7 |
| 4,481,757 A * | 11/1984 | Tsuchiya | | 56/16.9 |
| 4,878,340 A * | 11/1989 | Roy et al. | | 56/249 |
| 5,228,277 A * | 7/1993 | Smith et al. | | 56/16.9 |
| 5,511,365 A * | 4/1996 | Rice | | 56/7 |
| 5,553,380 A * | 9/1996 | Rice | | 29/895.2 |
| 5,682,735 A * | 11/1997 | Swenson et al. | | 56/249 |
| 5,732,538 A | 3/1998 | Thorman et al. | | |
| 6,732,500 B1 * | 5/2004 | Myers | | 56/17.2 |
| 7,114,318 B2 * | 10/2006 | Poulson et al. | | 56/249 |
| 7,395,648 B1 * | 7/2008 | Silbernagel et al. | | 56/17.2 |
| 7,624,560 B1 * | 12/2009 | Humphrey | | 56/17.2 |
| 7,631,477 B2 * | 12/2009 | Eavenson et al. | | 56/17.4 |
| 8,001,754 B2 * | 8/2011 | Michel | | 56/17.2 |

(Continued)

FOREIGN PATENT DOCUMENTS

GB   1098727   1/1968

OTHER PUBLICATIONS

Counter-rotating Greens Tender conditioners provide premium flexibility for any maintenance routine. Deere & Company Product catalog [online], [Retrieved on Feb. 10, 2010]. Retrieved from the Internet:<URL: http://www.deere.com/en_US/ProductCatalog/GT/servlet/com.deere.u90785.cce.productcatalog.view.servlets. ProdCatProduct?pNbr=5501M&tM=GT>.

(Continued)

*Primary Examiner* — Arpad Fabian-Kovacs

(57) ABSTRACT

A height of cut adjuster for a reel mower cutting unit with a removable attachment includes a front roller with a shaft positionable in front of the cutting reel axis, and a roller bracket assembly having a bottom bracket removably attached to a top bracket to provide a gap therebetween where the front roller shaft is held. The roller bracket assembly may be pivoted, and the top bracket may be connected to the bottom bracket in a different position further from the cutting reel, so that an attachment such as a conditioner may be installed between the front roller and the cutting reel.

9 Claims, 6 Drawing Sheets

U.S. PATENT DOCUMENTS

2002/0095922 A1* 7/2002 Goman et al. ............... 56/16.7

OTHER PUBLICATIONS

Easily accessible bedknife-to-reel and height-of-cut adjustments. Deere & Company Product catalog [online], [Retrieved on Feb. 10, 2010]. Retrieved from the InternetI<URL: http://www.deere.com/en_US/ProductCatalog/GT/servlet/com.deere.u90785.cce.productcatalog.view.servlets.ProdCatProduct?pNbr=1320TC&tM=GT>.

Gear-driven, counter-rotating rotary brush and Greens Tender conditioner for grain and thatch control. Deere & Company Product catalog [online], [Retrieved on Feb. 10, 2010]. Retrieved from the Internet<URL: http://www.deere.com/en_US/ProductCatalog/GT/servlet/com.deere.u90785.cce.productcatalog.view.servlets.ProdCatProduct?pNbr=1320TC&tM=GT>.

* cited by examiner

US 8,356,465 B2

HEIGHT OF CUT ADJUSTER ASSEMBLY FOR REEL MOWER CUTTING UNIT WITH REMOVABLE ATTACHMENT

FIELD OF THE INVENTION

This invention relates generally to height of cut adjuster assemblies for reel mower cutting units, and specifically to height of cut adjusters for reel mowers with removable attachments such as conditioners.

BACKGROUND OF THE INVENTION

Grass mowing machines with reel mower cutting units are used on golf courses and other turf areas that require grass to be cut very accurately. The cutting units are typically mounted to a walk behind mower or rolled across the surface of the ground by a powered vehicle. The cutting units include a generally cylindrical reel with a plurality of blades that rotate in close proximity to a stationary bedknife fixed with the frame of the cutting unit. Grass is cut by a shearing action between the bedknife and the rotation blades of the reel.

Walk behind reel mower cutting units may ride on a traction drum and ground engaging roller, while reel mower cutting units mounted to vehicles may have one roller in front and another behind the cutting reel. The opposing ends of the front roller may be mounted to height of cut adjuster assemblies attached to the frame of the cutting unit. To change the height of cut, the operator may turn an adjustment screw on each assembly to raise or lower the front roller.

However, if an attachment with an auxiliary drive is installed on the reel mower cutting unit, it may be necessary to mount the front roller at a different position further from the cutting reel axis. Attachments such as conditioners, roller power brushes, or turf grooming brushes may be used to improve the quality of the cut, performance, and other turf grooming features. Attachments may be rotated by auxiliary drives mounted to the reel mower cutting unit and powered by the shaft of the cutting reel. An auxiliary drive may transmit rotational power from the cutting reel shaft to the attachment through a set of gears or a belt on a pair of sprockets or pulleys.

A conditioner, for example, is an attachment used for finer grooming of turf areas such as putting greens, by reducing thatch, slicing stolons, controlling grain, and deflecting material away from the reel and bedknife. A conditioner may stand the grass up for an even, clean cut and truer putting green surface. A typical conditioner includes a number of (for example, 72) closely spaced vertical blades mounted on a horizontal shaft adjacent one of the rollers. The blades may have a diameter of between about 40 and 80 mm, and preferably between about 50 and 65 mm. A conditioner may be counter-rotated to the direction of travel of the cutting unit. An auxiliary drive transmits rotational power from the cutting reel shaft to the conditioner. For example, an auxiliary drive for a conditioner may include a set of gears that rotate the conditioner at speeds of about 2000 rpm. The input shaft of an auxiliary drive may be removably connected to the shaft of the cutting reel, and the output shaft may be removably connected to the attachment.

When an attachment with an auxiliary drive is installed onto a reel mower cutting unit, the front roller must be shifted to a position further from the cutting reel. The conditioner or other attachment then may be installed directly in front of the cutting reel. Shifting the front roller to a position further from the cutting reel axis requires switching to a different height of cut adjuster assembly for the front roller. This is labor intensive and time consuming.

A height of cut adjuster assembly is needed for a reel mower cutting unit that may be used while a removable attachment such as a conditioner or rotary brush is installed on a reel mower cutting unit, and that also can be used if the attachment is removed. A height of cut adjuster assembly is needed that simplifies changing the position of the front roller relative to the cutting reel. A height of cut adjuster assembly is needed that reduces labor and time requirements for installing or removing an attachment onto a reel mower cutting unit.

SUMMARY OF THE INVENTION

A height of cut adjuster assembly for a reel mower cutting unit with a removable attachment includes a roller bracket assembly attached to the reel mower cutting unit and supporting a front roller shaft forwardly of the reel mower cutting unit. The roller bracket assembly may be raised or lowered to change the cutting height of the reel. The roller bracket assembly is adjustable to change the spacing between the front roller shaft and the reel mower cutting unit for connecting a removable attachment therebetween. In one embodiment, the roller bracket assembly is pivotable between a forward facing position and a rearward facing position.

The height of cut adjuster assembly may be used with a removable attachment such as a conditioner or rotary brush on a reel mower cutting unit, or without such an attachment. The height of cut adjuster assembly simplifies changing the position of the front roller, and reduces labor and time requirements for installing or removing an attachment such as a conditioner onto a reel mower cutting unit.

DESCRIPTION OF THE PREFERRED EMBODIMENT

Figure 1:
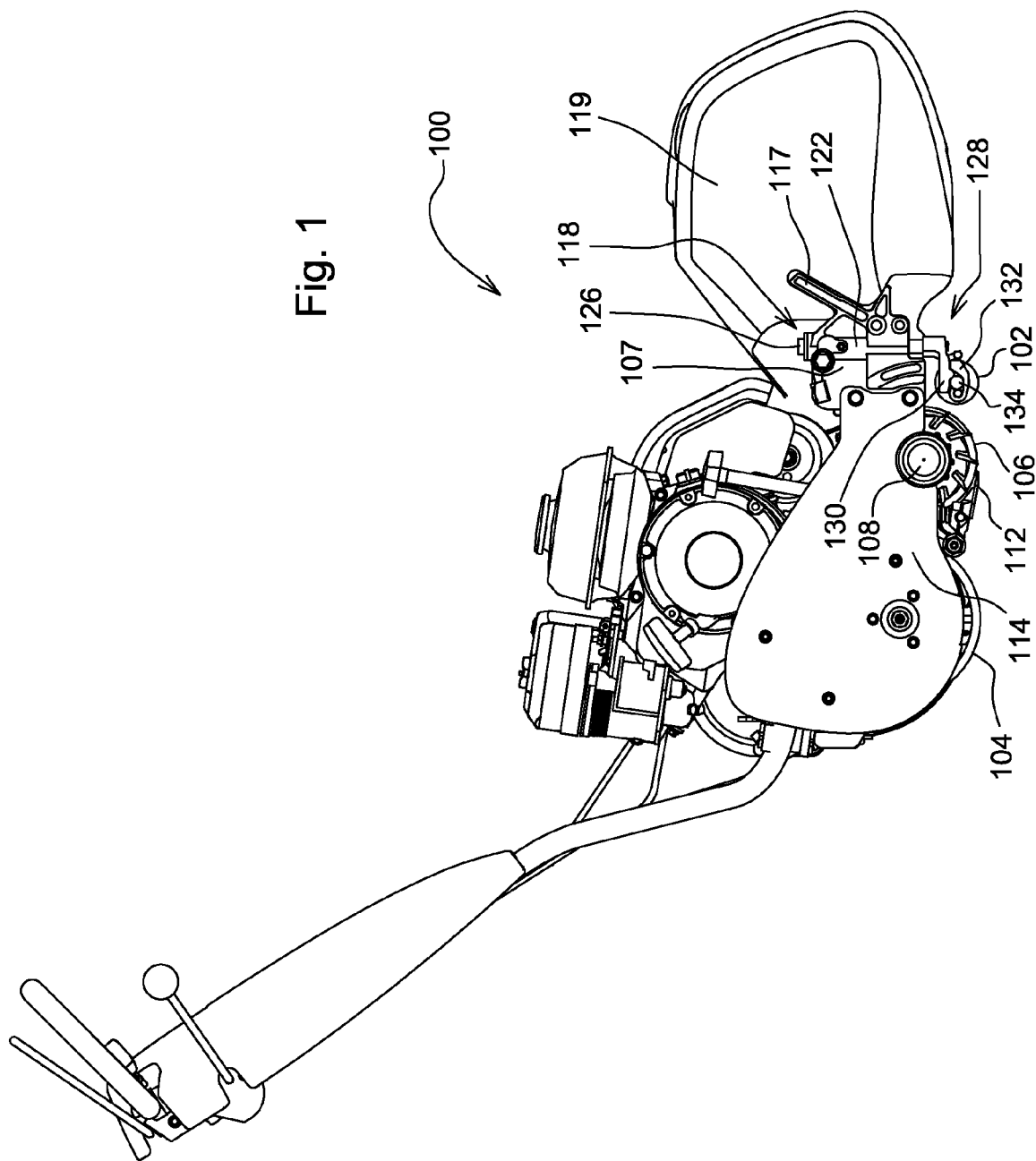
FIG. 1 is a side view of a reel mower cutting unit with a height of cut adjuster assembly in a first position without an attachment according to a first embodiment of the invention.

In one embodiment, reel mower cutting unit 100 has a front roller 102 and a traction drum 104 that roll in contact with the ground and support the cutting unit during mowing operations. The traction drum may be engaged by a transmission or belt powered by an internal combustion engine, electric motor or other power source mounted on the reel mower cutting unit. The reel mower cutting unit includes a generally cylindrical reel 106 having a plurality of blades on cutting reel shaft 108 to rotate about the cutting reel shaft's laterally extending horizontal axis. The cutting reel shaft may be rotated with an electric motor, hydraulic motor or belt drive from the internal combustion engine or other power source. As the blades of the cutting reel rotate, they pass in close proximity to bedknife 112 positioned between a pair of side panels 114 of the cutting unit frame. The blades and bedknife interact to cut grass with a shearing action as the cutting unit is propelled forward.

Figure 2:
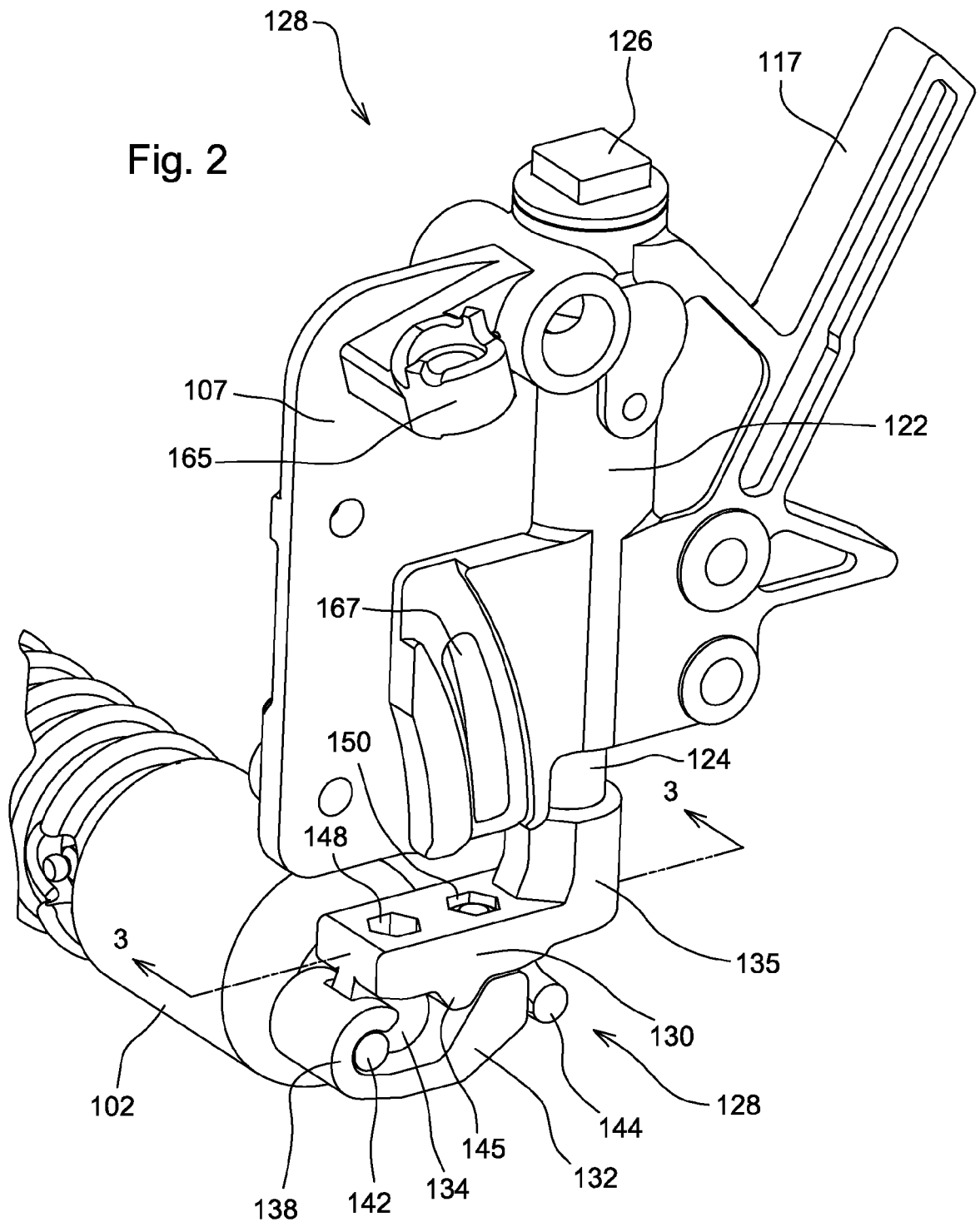
FIG. 2 is a perspective view of a height of cut adjuster assembly in a first position without an attachment according to a first embodiment of the invention.
Figure 3:
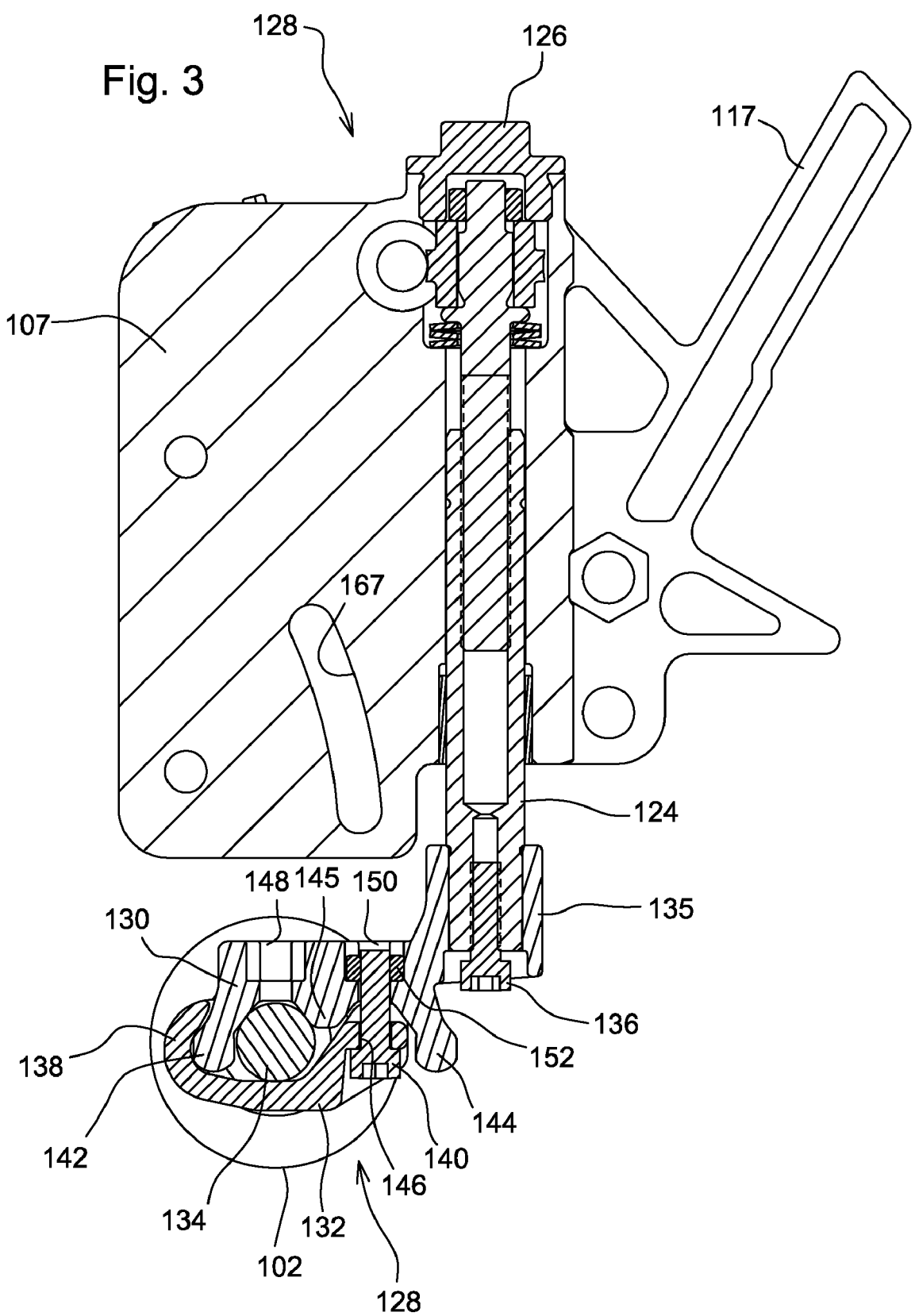
FIG. 3 is a cross section view of a height of cut adjuster assembly in a first position without an attachment according to a first embodiment of the invention.

In the embodiment of FIGS. 1-3, reel mower cutting unit 100 is shown without an attachment such as a conditioner or rotary brush. Front roller 102 is mounted directly in front of cutting reel 106 using a pair of height of cut adjuster assemblies 118 at the left and right sides of the reel mower cutting unit frame. Each height of cut adjuster assembly may include a casting bracket 107 that is bolted or otherwise secured to a side panel of the reel mower cutting unit frame.

In one embodiment, each height of cut adjuster assembly 118 may include a support arm 117 for grass catcher 119. Each height of cut adjuster assembly also may include a vertically aligned internal bore 122 through which height of cut adjuster rod 124 extends. An operator may change the height of cut by turning head 126 which is may be engaged with threads to the top end of the height of cut adjuster rod.

In one embodiment, turning head 126 raises or lowers roller bracket assembly 128 at the lower end of the height of cut adjuster rod. Optionally, the height of cut adjuster rods on the left and right sides of the reel mower cutting unit may be linked together so that an operator can simultaneously change the height of cut on both sides of the cutting reel from a single adjustment point.

In one embodiment, each roller bracket assembly 128 may be attached to the lower end of a height of cut adjuster rod 124. The roller bracket assembly may be reversible to mount the front roller in either the rearward facing position or forward facing position. To reverse the roller bracket assembly between the rearward and forward facing positions, the roller bracket assembly may be pivoted on the axis of height of cut adjuster rod 124.

Figure 4:
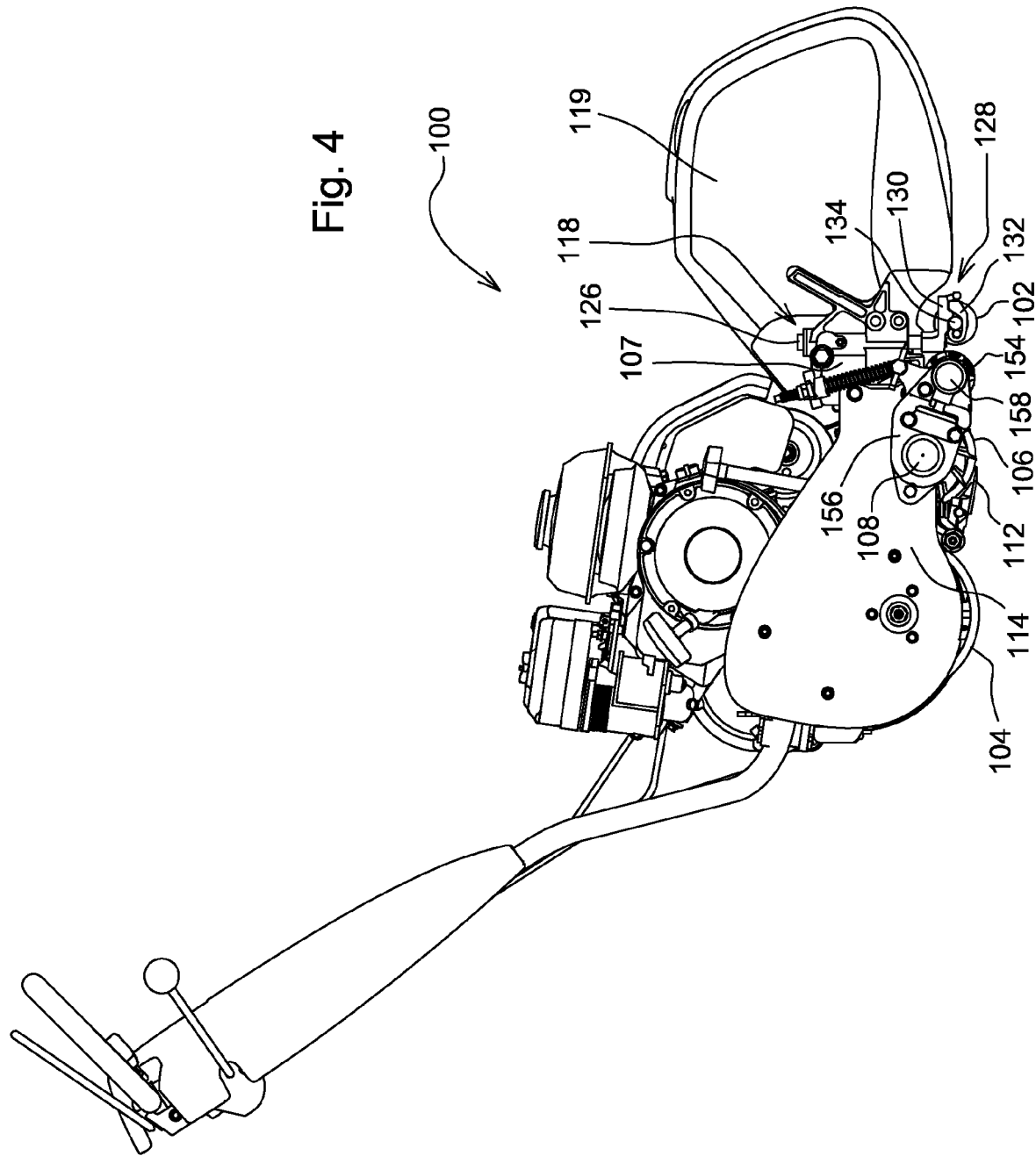
FIG. 4 is a side view of a reel mower cutting unit with a height of cut adjuster assembly in a second position with an attachment according to a first embodiment of the invention.
Figure 5:
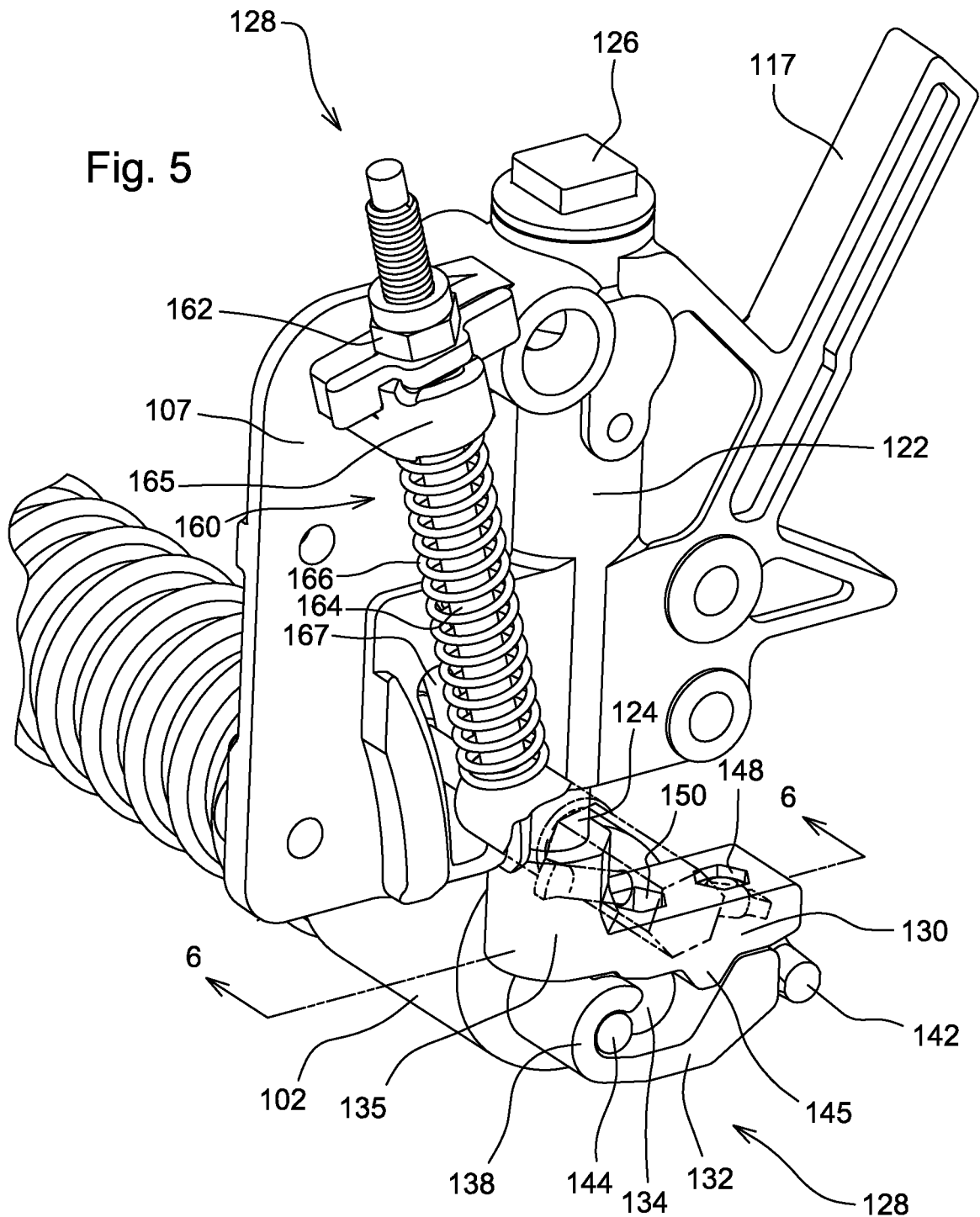
FIG. 5 is a perspective view of a height of cut adjuster assembly in a second position with an attachment according to a first embodiment of the invention.
Figure 6:
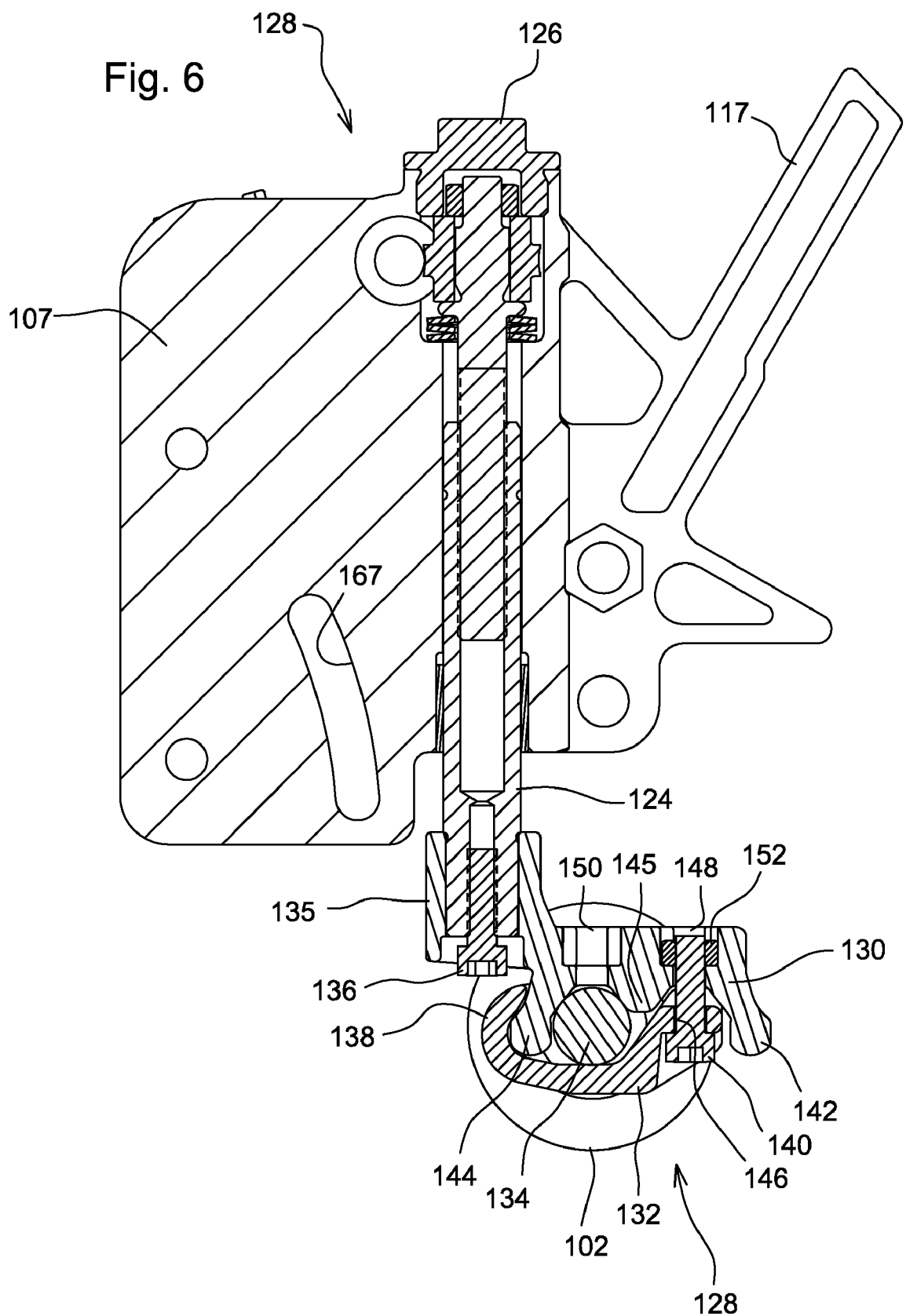
FIG. 6 is a cross section view of a height of cut adjuster assembly in a second position with an attachment according to a first embodiment of the invention.

For example, the pair of roller bracket assemblies 128 may mount the front roller in a rearward facing position as shown in FIGS. 1-3. The rearward facing position, with the roller bracket assembly extending behind the height of cut adjuster rod, may be used without an attachment such as a conditioner. The roller bracket assemblies also may mount the front roller in a forward facing position as shown in FIGS. 4-6. In the forward facing position, the roller bracket assembly extends in front of the height of cut adjuster rod. The forward facing position may be used if an attachment such as a conditioner is mounted to the cutting unit because it positions the front roller further from the cutting reel axis, providing adequate space for the conditioner between the cutting reel and the front roller.

In one embodiment, each roller bracket assembly 128 may include top bracket 130 and bottom bracket 132. If the top and bottom brackets are assembled together, shaft 134 of front roller 102 is held in a gap between the top and bottom brackets. The top bracket may have a sleeve 135 through which threaded fastener 136 may be inserted for engaging the internally threaded lower end of height of cut adjuster rod 124. To pivot the top bracket on the sleeve, threaded fastener 136 may be loosened and retightened.

In one embodiment, the top and bottom brackets 130, 132 of the roller bracket assembly are castings held together by hooked attachment member 138 and threaded fastener 140. The hooked attachment member may be integral with the bottom bracket, and may be secured around either first handle 142 or second handle 144 extending from and integral with the top bracket. The first and second handles may be generally cylindrical and parallel to the front roller shaft axis. The bottom bracket also may include downwardly extending protrusion 145 between the first and second handles 142, 144. The shaft of the front roller may be positioned between the protrusion and one of the handles. Threaded fastener 140 may be inserted through hole 146 in the bottom bracket and then through either first hole 148 or second hole 150 in the top bracket, depending on the desired position. Each of the first and second holes may have a hex pocket where hex nut 152 may be located and engaged to the threaded fastener.

In one embodiment, the top and bottom brackets of the roller bracket assembly may be assembled in the rearward facing position by securing hooked attachment member 138 around first bar 142 and inserting threaded fastener 140 through first hole 148 and onto hex nut 152. Alternatively, with the top and bottom brackets in the rearward facing position, the front roller may be positioned slightly further from the reel axis by securing hooked attachment member 138 around second bar 144 and inserting threaded fastener through second hole 150.

In one embodiment, the top and bottom brackets may be assembled together in the forward facing position by securing hooked attachment member 138 around second bar 144 and inserting threaded fastener 140 through second hole 150 and onto hex nut 152. Alternatively, with the top and bottom brackets in the forward facing position, the front roller may be positioned slightly further from the reel axis by securing hooked attachment member 138 around first bar 142 and inserting threaded fastener through first hole 148.

FIGS. 4-6 show conditioner 154 or another attachment such as a rotary brush mounted to the reel mower cutting unit with the height of cut adjuster assembly. The conditioner may include a plurality of blades extending radially from a shaft, and may be gear driven and may counter-rotate to the direction of the reel to stand up grass for a premium quality of cut. Auxiliary drive 156 may transmit rotational power from cutting reel shaft 108 to conditioner drive shaft 158, which are parallel to each other. The auxiliary drive unit may be a gear case or belt drive, and preferably is enclosed within a housing removably attached to a side panel of the reel mower cutting unit.

In one embodiment, the depth of engagement of the conditioner or other attachment may be adjusted. For example, depth control tower system 160 may be used to pivot the conditioner or other attachment, and the auxiliary drive housing, to an operating depth either below or above the cutting height of the reel. Locknut 162 on top of the tower may be turned clockwise to raise the conditioner and counterclockwise to lower the conditioner. The depth control tower system may include rod 164 extending between the upper ring 165 and curved slot 167 in height of cut adjuster assembly and the auxiliary drive housing, and the system may be spring loaded with spring 166 pushing the conditioner downwardly towards the turf when the conditioner is used.

In one embodiment, the height of cut adjuster assembly may provide a plurality of mounting positions for the front roller with respect to the cutting reel and the cutting reel axis, without removing the assembly from the side panel of the cutting reel. Instead, the operator may reverse the roller bracket assembly between a forward or reverse orientation, each of which has several height of cut options for the cutting reel. To change the front roller position, the operator must loosen threaded fastener 140 and unhook the bottom bracket from a handle on the top bracket, turn the top bracket 180 degrees, and then reattach the bottom bracket back hook and threaded fastener. No other components or parts are needed to change the front roller's mounting position relative to the cutting reel. As a result, the height of cut adjuster of the present invention reduces labor time to remove or install an attachment such as a conditioner from a reel mower cutting unit.

Having described a preferred embodiment, it will become apparent that various modifications can be made without departing from the scope of the invention as defined in the accompanying claims.

The invention claimed is:

1. A height of cut adjuster on a reel mower cutting unit with a removable attachment and a cutting reel with a generally horizontal axis, comprising:
    a front roller with a shaft positioned in front of the cutting reel axis;
    a roller bracket assembly holding the front roller shaft;
    a height of cut adjuster rod having a generally vertical axis and attached to the roller bracket assembly; the roller bracket assembly being reversible between a forward facing orientation holding the front roller shaft in front of the height of cut adjuster rod and a rearward facing orientation holding the front roller shaft behind the height of cut adjuster rod by pivoting the roller bracket assembly on the vertical axis of the height of cut adjuster rod;
    wherein the roller bracket assembly includes a bottom bracket and a hooked attachment member secured onto a top bracket; and the top bracket includes a first handle and a second handle where the hooked attachment member may be secured.

2. The height of cut adjuster of claim 1 further comprising a conditioner positioned forwardly of the cutting reel axis while the roller bracket assembly is in the forward facing orientation.

3. The height of cut adjuster of claim 1 further comprising a threaded fastener between the top bracket and the bottom bracket.

4. The height of cut adjuster of claim 1 wherein the front roller may be mounted in a plurality of locations in each of the forward facing orientation and the rearward facing orientation.

5. A height of cut adjuster on a reel mower cutting unit with a removable attachment, comprising:
    a roller bracket assembly attached to the reel mower cutting unit and supporting a front roller shaft forwardly of the reel mower cutting unit and adjustable to raise or lower the front roller shaft; and
    the roller bracket assembly pivoting on a vertical axis while remaining attached to the reel mower cutting unit between a forward facing position in which the front roller shaft is in front of the vertical axis, and a rearward facing position in which the front roller shaft is behind the vertical axis, to change the spacing between the front roller shaft and the reel mower cutting unit for connecting the removable attachment therebetween;
    the roller bracket assembly comprising a top bracket and a bottom bracket, and the front roller shaft is held in a gap between the top bracket and the bottom bracket.

6. The height of cut adjuster of claim 5 further comprising an auxiliary drive mounted between the removable attachment and the reel mower cutting unit to rotate the attachment.

7. A height of cut adjuster on a reel mower cutting unit with a removable attachment, comprising:
    a ground engaging roller located forwardly of a horizontal axis of the cutting reel, the roller having a shaft with opposing ends captured between a top bracket and a bottom bracket;
    the top bracket connected to a rod that is rotatable to raise and lower the top bracket to change the height of cut of the cutting reel;
    the bottom bracket connected to the top bracket and pivotable between a forward facing position in which the roller shaft is in front of the rod and a rearward facing position in which the roller shaft is behind the rod while the top bracket is connected to the rod, one of the positions capturing the shaft at a location spaced sufficiently from the horizontal axis of the cutting reel to mount the attachment between the roller and the cutting reel axis;
    wherein the top bracket is connected to the bottom bracket with a hooked attachment member and a threaded fastener.

8. The height of cut adjuster of claim 7 wherein the attachment is a conditioner having rotating blades.

9. The height of cut adjuster of claim 7 wherein the attachment is rotated by an auxiliary drive unit receiving rotational power from the cutting reel.

* * * * *